US009455969B1

(12) United States Patent
Cabrera et al.

(10) Patent No.: US 9,455,969 B1
(45) Date of Patent: *Sep. 27, 2016

(54) PROVIDING ENHANCED ACCESS TO REMOTE SERVICES (75) Inventors: Luis Felipe Cabrera, Bellevue, WA (US); Allan H. Vermeulen, Seattle, WA (US); Peter N. DeSantis, Cap Town (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,884

(22) Filed: Sep. 14, 2012

Related U.S. Application Data (63) Continuation-in-part of application No. 11/764,739, filed on Jun. 18, 2007, now Pat. No. 8,312,154.

(51) Int. Cl.
- *G06F 15/16* (2006.01)
- *H04L 29/06* (2006.01)
- *G06F 21/41* (2013.01)
- *H04W 12/06* (2009.01)

(52) U.S. Cl.
CPC ............... *H04L 63/08* (2013.01); *G06F 21/41* (2013.01); *H04L 63/083* (2013.01); *H04W 12/06* (2013.01)

(58) Field of Classification Search
CPC ..... H04L 63/08; H04L 63/083; G06F 21/41; H04W 12/06
USPC ......................................... 709/227, 228, 229
See application file for complete search history.

(56) References Cited

U.S. PATENT DOCUMENTS

| | | |
|---|---|---|
| 5,991,810 A | 11/1999 | Shapiro et al. |
| 6,411,967 B1 | 6/2002 | Van Renesse |
| 6,463,474 B1 | 10/2002 | Fuh et al. |
| 6,529,953 B1 | 3/2003 | Van Renesse |
| 6,668,283 B1 | 12/2003 | Sitaraman et al. |
| 6,668,322 B1 | 12/2003 | Wood et al. |
| 6,724,770 B1 | 4/2004 | Van Renesse |
| 6,959,336 B2 | 10/2005 | Moreh et al. |
| 6,985,953 B1 | 1/2006 | Sandhu et al. |

(Continued)

OTHER PUBLICATIONS

"Grid Computing Solutions," Sun Microsystems, Inc., retrieved May 3, 2006, from http://www.sun.com/software/grid, 3 pages.

(Continued)

*Primary Examiner* — Hieu Hoang
(74) *Attorney, Agent, or Firm* — Seed IP Law Group PLLC (57) ABSTRACT

Techniques are described for providing client computing nodes with enhanced access to remote network-accessible services, such as by providing local capabilities specific to the remote services. In at least some situations, access to remote services by a client computing node may be enhanced by automatically locally performing some activities of the remote services, such as to improve the efficiency of communications that are sent between the client computing node and the remote service and/or to improve the efficiency by the remote service of processing communications from the client computing node. As one example, a node manager system local to a client computing node may perform authentication of communications sent by the client computing node to a remote service and/or may perform other activities specific to the remote service, so that the remote service does not need to perform the authentication and/or other performed activities for the communications.

18 Claims, 4 Drawing Sheets

(56) References Cited

U.S. PATENT DOCUMENTS

| | | | |
|---|---|---|---|
| 7,194,761 | B1 | 3/2007 | Champagne |
| 7,219,154 | B2 | 5/2007 | Blakley, III et al. |
| 7,269,659 | B2 | 9/2007 | Kadyk et al. |
| 7,293,098 | B2 | 11/2007 | Sandhu et al. |
| 7,343,398 | B1 | 3/2008 | Lownsbrough |
| 7,469,298 | B2 | 12/2008 | Kitada et al. |
| 7,475,146 | B2 | 1/2009 | Bazot et al. |
| 7,503,065 | B1 * | 3/2009 | Packingham et al. .......... 726/12 |
| 7,562,382 | B2 | 7/2009 | Hinton et al. |
| 7,657,639 | B2 | 2/2010 | Hinton |
| 7,681,229 | B1 | 3/2010 | Ebrahimi et al. |
| 7,698,375 | B2 | 4/2010 | Hinton et al. |
| 7,707,293 | B2 | 4/2010 | Zhang |
| 7,769,845 | B2 | 8/2010 | Baron |
| 7,804,820 | B2 | 9/2010 | Shi et al. |
| 7,890,640 | B2 | 2/2011 | Ribot |
| 7,954,144 | B1 | 5/2011 | Ebrahimi et al. |
| 7,984,157 | B2 | 7/2011 | Panasyuk et al. |
| 8,166,524 | B2 | 4/2012 | Sentinelli |
| 2002/0156906 | A1 | 10/2002 | Kadyk et al. |
| 2002/0165971 | A1 | 11/2002 | Baron |
| 2003/0163569 | A1 | 8/2003 | Panasyuk et al. |
| 2004/0128393 | A1 | 7/2004 | Blakley, III et al. |
| 2004/0158811 | A1 | 8/2004 | Guthrie et al. |
| 2004/0193712 | A1 | 9/2004 | Benenati et al. |
| 2004/0249961 | A1 | 12/2004 | Katsube et al. |
| 2005/0138179 | A1 | 6/2005 | Encarnacion et al. |
| 2006/0075114 | A1 | 4/2006 | Panasyuk et al. |
| 2007/0064943 | A1 | 3/2007 | Ginter et al. |
| 2007/0094401 | A1 | 4/2007 | Gagne et al. |
| 2007/0204048 | A1 | 8/2007 | Zhang |
| 2007/0250833 | A1 * | 10/2007 | Araujo et al. .................... 718/1 |

OTHER PUBLICATIONS

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Mar. 2003, Linuxpro, Part 1, retrieved from http://davidcoulson.net/writing/lxf/38/ipstables.pdf, 4 pages.

Coulson, D., "Network Security Iptables," Apr. 2003, Linuxpro, Part 2, retrieved from http://davidcoulson.net/writing/lxf/39/ipstables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron , retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

* cited by examiner

PROVIDING ENHANCED ACCESS TO REMOTE SERVICES

CROSS-REFERENCE TO RELATED APPLICATIONS

This application is a continuation of co-pending U.S. application Ser. No. 11/764,739, filed Jun. 18, 2007 and entitled "Providing Enhanced Access to Remote Services," which is hereby incorporated by reference in its entirety.

TECHNICAL FIELD

The following disclosure relates generally to providing client computing nodes with enhanced access to remote network-accessible services.

BACKGROUND

As the use of the Internet and the World Wide Web ("Web") has become widespread, it is increasingly common for software applications to access and use services provided by remote computing systems, such as via defined APIs ("application program interfaces"). Such remote services may provide a variety of types of functionality, and in some situations may be provided by third parties, such as for a fee. One example of such remote services are Web services, which allow heterogeneous applications and computers to interact, and which may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

In addition, software applications may be executed and interact with remote services in various ways. For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. When a software application executing on a virtual machine hosted by a computing system in a data center sends a communication to a remote service external to the data center, the communication typically passes through management software on the computing system and then multiple other devices before leaving the data center and traveling to the computing system providing the remote service.

Although Web services and other remote services allow various applications and computers to interact, the current implementations and uses of Web services have various problems. For example, due to the insecure nature communications over the Web, if such remote services provide confidential or otherwise restricted information and other functionality, the remote services will typically authenticate each received communication from a remote client in order to verify that the client is authorized to obtain the requested functionality. These authentication activities are typically performed even for repeated communications from a client whose previous communications have been authenticated, as the remote service cannot ensure that a new communication actually comes from that client without the authentication. However, such authentication activities by the remote services consume significant resources, and in some situations may necessitate expensive hardware setups to accommodate the communications (e.g., having one or more hardware load balancers that receive communications and then direct each communication to an appropriate one of multiple Web server devices to handle the authentication and other pre-processing activities for the communication).

DETAILED DESCRIPTION

Techniques are described for providing client computing nodes with enhanced access to remote network-accessible services, such as by providing and using local capabilities specific to the remote services. In at least some embodiments, the computing nodes may be physical computing systems and/or virtual machines that are each hosted on one or more physical computing systems. In addition, in at least some embodiments, the access to remote services by a client computing node may be enhanced by automatically performing some activities of the remote services in a manner local to the client computing node, such as to improve the efficiency of communications that are sent between the client computing node and the remote service and/or to improve the efficiency by the remote service of processing communications from clients. As one example, a node manager system that manages a local client computing node may perform authentication of communications sent by the client computing node to a remote service and/or may perform other activities specific to the remote service, so that the remote service does not need to perform the authentication and/or other performed activities for the communications, allowing the remote service to use less resources to provide a given level of capabilities. In at least some embodiments, the described techniques are automatically performed by an embodiment of a Node Manager system, as described in greater detail below.

Figure 1A:
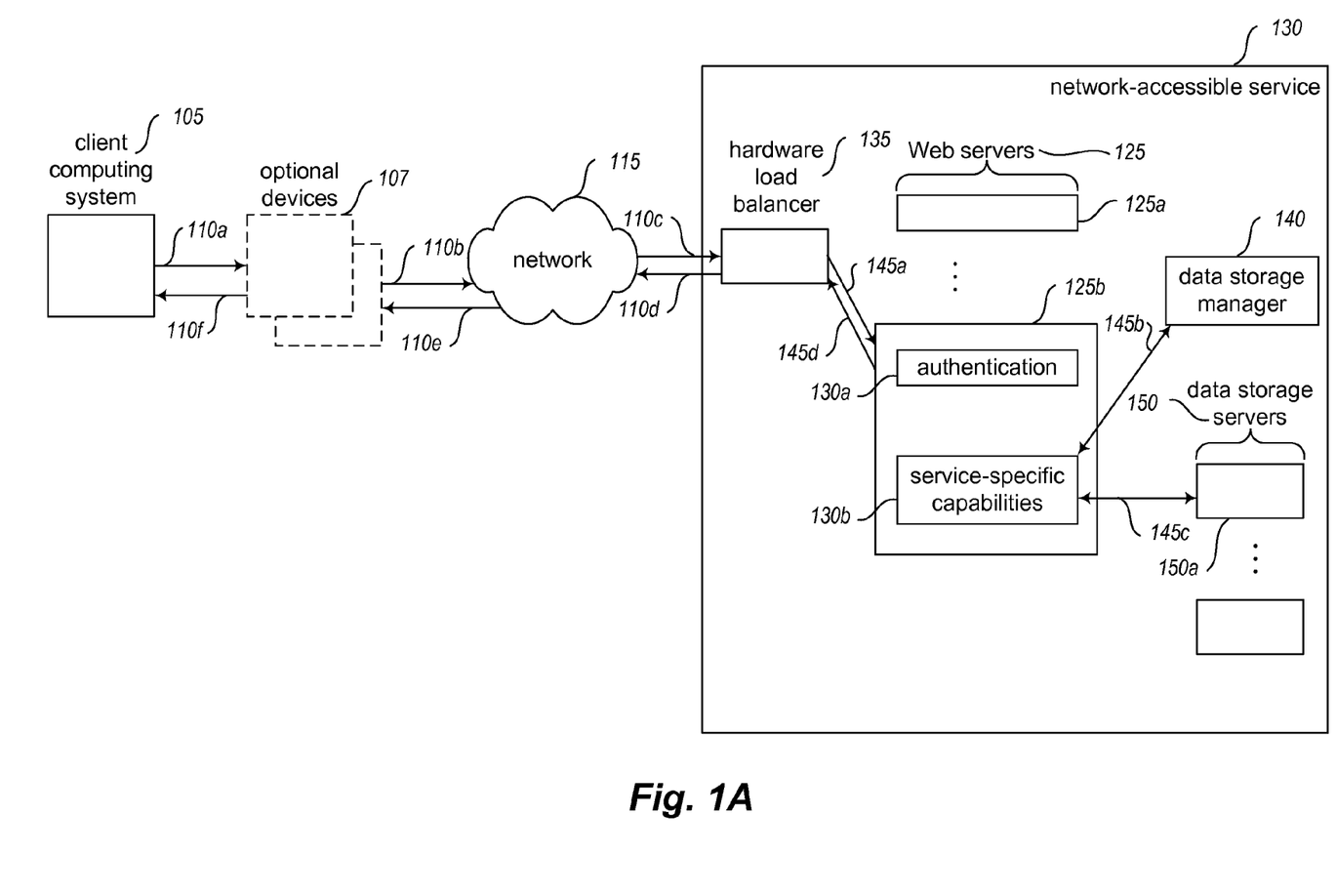
FIGS. 1A and 1B are network diagrams illustrating examples of software applications interacting with remote network-accessible services.
Figure 1B:
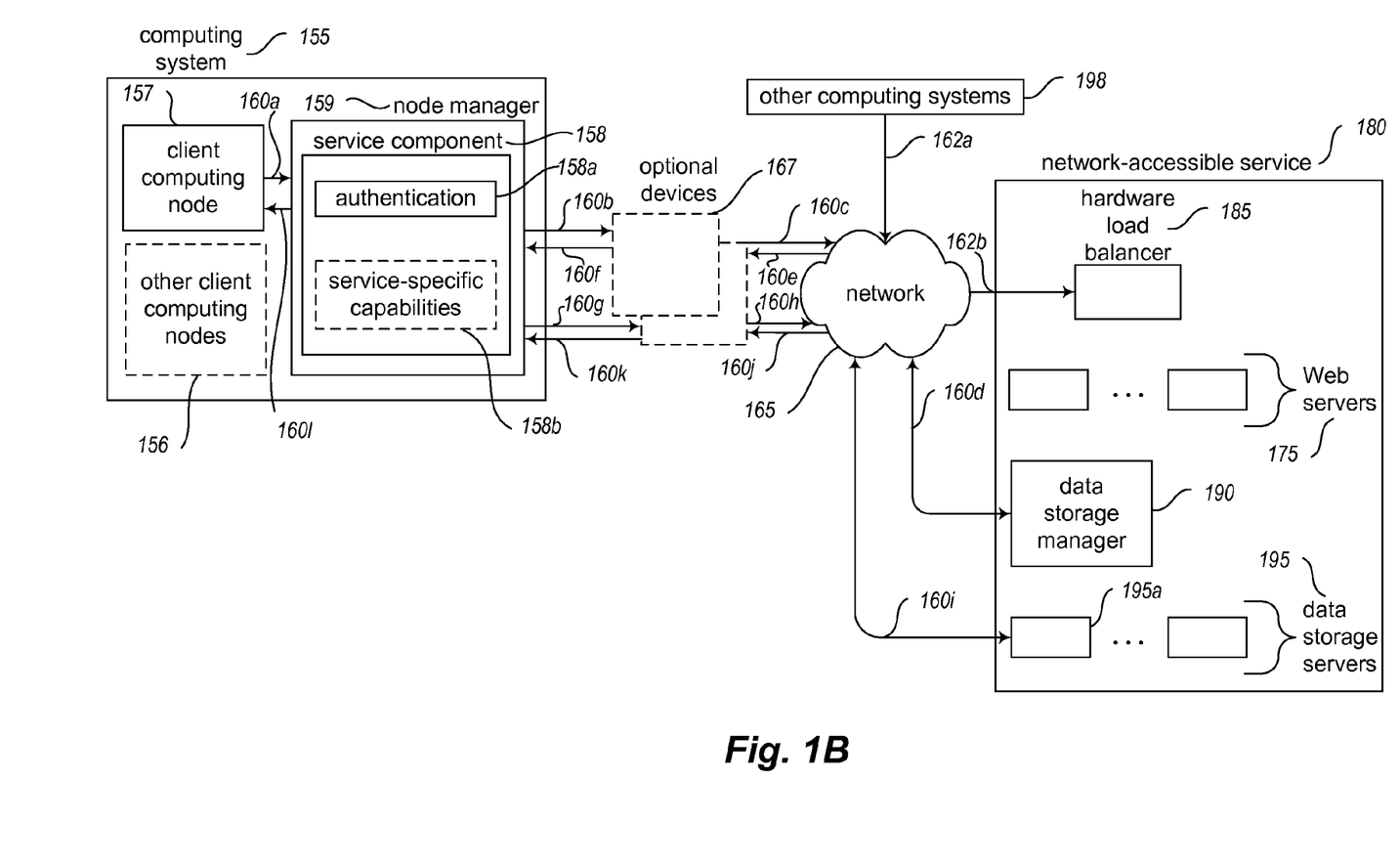

FIG. 1A is a network diagram that illustrates an example of typical types of communications between client nodes and remote network-accessible services as part of the client nodes obtaining requested functionality from the remote services, and FIG. 1B is a similar diagram with a client node that is a virtual machine and a node manager system that provides enhanced access to remote network-accessible services as part of the client nodes obtaining requested functionality from the remote services. In particular, in the example of FIG. 1A, a software program (not shown) executing on a client computing system 105 initiates a communication 110a to obtain desired functionality from a remote network-accessible service 130. The communication 110a may optionally be received and forwarded 110b by one or more optional devices 107 before reaching a network 115 (e.g., the Internet) in this example. The optional devices 107 may include, for example, one or more proxy server devices and/or networking devices (e.g., routers), such as if client computing system 105 is part of a local area network of an organization or is connected to the network 115 via devices of an ISP ("Internet Service Provider"), and in some situations the devices 107 may perform some filtering or other processing of communications. In other embodiments, no such devices 107 may be present and/or other types of communication forwarding may occur, including communications that are not forwarded over such a network.

After the communication 110a passes through the network 115, it is forwarded 110c to the remote network-accessible service 130. In this example, the service 130 includes a hardware load balancer 135, which receives incoming communications and directs them to an appropriate one of multiple Web server devices 125, with communication 110a being forwarded 145a to Web server 125b in this example. In this example, the remote service 130 is a Web service, and the initiated communication may be an HTTP-based SOAP or REST communication that invokes an API provided by the remote service. In other embodiments, other types of remote services and/or communications may be used. Furthermore, in embodiments with types of remote services other than Web services, types of servers other than Web servers may be used to process communications, and/or hardware load balancers may not be used.

As illustrated in detail for Web server 125b, each of the Web servers in this example may perform various activities as part of service 130's response to the communication and provision of corresponding functionality as appropriate. In this example, Web server 125b includes a component 130a to perform authentication of the incoming communication, and may have one or more other components 130b to provide other capabilities specific to the service 130. The authentication of the incoming communication may have various forms, such as to verify that the communication is from a particular client (e.g., based on use of a predefined client identifier and/or of secret information specific to that client, such as from a prior registration by the client or other prior interactions with the client), to verify that the communication contents have not been changed after it is created (e.g., based on an included message digest using a cryptographic hash or other form of digital signature, or based on use of a checksum), etc. The other service-specific capabilities from components 130b may also have various forms. In this example, the service 130 provides clients with access to various types of stored information (e.g., information previously stored by the clients). Accordingly, if the communication 110a is a request for a particular group of stored information, the service-specific capabilities may include interacting 145b with a data storage manager 140 to determine on which of multiple data storage servers 150 that the requested information is stored, and then interacting 145c with a particular data storage server (in this example server 150a) to retrieve the requested information.

The Web server 125b that is handling the received communication 110a then responds to the communication as appropriate, which in this example includes sending the requested stored information to the client 105. In particular, the Web server 125b sends one or more response communications to the client 105 that travel the same or a similar path in reverse as did communication 110a when traveling to the remote service from the client. In this example, a response communication 145d is sent to the hardware load balancer 135, which forwards 110d the communication to the network 115. The communication 145d is then forwarded 110e to the optional devices 107 (if present), which forward 110f the communication 145d to the client 105. In this manner, the client 105 may obtain requested functionality from a remote service. It will be appreciated that the example in FIG. 1A is greatly simplified for the sake of understanding, and that large numbers of clients may be simultaneously accessing large numbers of remote services via numerous network devices and other intermediate devices.

FIG. 1B is a network diagram that is similar to FIG. 1A, but illustrates a client that is a virtual machine node, and the use of a node manager system to provide enhanced access to remote network-accessible services. For illustrative purposes, some embodiments are described herein in which specific types of computing nodes, networks, communications, and activities are performed. These examples are provided for illustrative purposes and are simplified for the sake of brevity, and the inventive techniques can be used in a wide variety of other situations, some of which are discussed herein. In particular, in the example of FIG. 1B, the client is a virtual machine node 157 executing on a computing system 155, which may optionally also be executing other virtual machine computing nodes 156. The computing system 155 also executes a node manager software system 159 that manages at least some operations of the virtual machine nodes of the computing system, such as by acting as part of a hypervisor or other virtual machine monitor for the computing system 155. Such virtual machine monitors may receive and forward outgoing communications from virtual machine nodes, and receive and direct incoming communications to a designated virtual machine node recipient.

In this example, a software program (not shown) executing on client node 157 initiates a communication 160a to obtain desired functionality from a remote network-accessible service 180. Remote service 180 is a service from which information may be obtained in a manner similar to or identical to that of service 130 of FIG. 1A in this example, and the communication 160a is to obtain information from the remote service in a manner similar to that of communication 110a of FIG. 1A. The client node 157 is unaware of the presence of node manager 159 in this example, and thus communication 160a may be identical or near-identical to that of communication 110a of FIG. 1A (e.g., if sent by the same client to the same remote service to obtain the same requested functionality). However, in this example the communication 160a is received by the node manager 159 before leaving the computing system 155. Moreover, unlike the example in FIG. 1A, the node manager 159 in this example provides additional capabilities rather than merely forwarding on the communication 160a. In particular, the node manager 159 includes a software component 158 that is specific to remote service 180, so that the component 158 may be used by the node manager 159 to perform some of the activities that would otherwise be performed by the remote service 180. In this example, the software component 158 includes a sub-component 158a to provide authentication-related capabilities, and optionally one or more other sub-components 158b to provide other types of capabilities specific to the remote service 180. Thus, the node manager uses the sub-component 158a to authenticate the received communication 160a in a manner similar to that of component 130a of FIG. 1A.

Furthermore, in this example the other sub-components 158b on the node manager 159 include functionality similar to that of component(s) 130b of FIG. 1A, including the ability to interact with internal systems that are part of the remote service 180 to obtain requested functionality. Accordingly, after communication 160a is authenticated, one of the other sub-components 158b initiates a new communication 160b to obtain requested functionality from the remote service 180. In particular, rather than using the default interface of remote service 180, in which new incoming communications are directed to a hardware load balancer 185 for forwarding to one of the Web servers 175, the communication 160b from the node manager 159 is directed to an internal data storage manager system 190 of the remote service 180 (e.g., using a separate interface that is not publicly exposed and/or that is available only to authorized requesters). In a manner similar to FIG. 1A, the communication 160b optionally passes through one or more devices 167, and if so is forwarded 160c by them to a network 165. However, the communication 160b is forwarded by the network directly to the data storage manager system, resulting in interactions 160d to obtain information on which of multiple data storage servers 195 that the requested information is stored. The information about the data storage server that stores the requested information (in this example, data storage server 195a) is then forwarded 160e back to the node manager 159, optionally passing through the device(s) 167, and if so is forwarded 160f by them to the node manager.

It will be appreciated that new communication 160b generated by node manager 159 in this example may be based on received communication 160a in various ways, such as to create communication 160b by altering communication 160a or to otherwise include information from communication 160a in communication 160b (e.g., information specific to client node 157, such as a client identifier corresponding to a user or other client on whose behalf the executing software initiates the communication 160a; information specific to the request, such as an identifier corresponding to the desired information; etc.). In addition, new communication 160b may include additional information that is not included in received communication 160a, such as information specific to node manager 159 so that the new communication 160b will be treated by the remote service 180 as coming from an authorized requester.

After the node manager 159 receives the information from the remote service indicating that data storage server 195a stores the desired information, the node manager 159 initiates an additional communication 160g that is directed to the particular data storage server 195a that stores the desired information. The communication 160g optionally passes through the device(s) 167, and if so is forwarded 160h to the network 165. The communication 160g is then forwarded to data storage server 195a, resulting in interactions 160i to obtain the stored requested information. The obtained information is then forwarded 160j back to the node manager 159, optionally passing through the device(s) 167, and if so is forwarded 160k by them to the node manager. After receiving the requested stored information, the node manager 159 sends communication 160l to client node 157 to provide the information to the client node. In at least some embodiments, communication 160l will be sent to client node 157 by node manager 159 as if the communication arrived from the remote service 180 in response to the initial communication 160a, without any indication of node manager 159 being involved. Thus, as previously noted, client node 157 may be unaware of some or all of the activities of the node manager 159, including that the node manager alters communication 160a and/or replaces communication 160a with one or more communications from the node manager 159.

While not illustrated here, in some embodiments additional communications from client node 157 to remote services may be further enhanced in additional ways. For example, node manager 159 may track or have access to information about each of the virtual machine nodes 157 and 156 and about communications between the virtual machine nodes and remote services, and may use that information in various ways. As one example, information about virtual machine node 157 may be used by the node manager 159 when authenticating communication 160a, such as to verify information about one or more software programs that issued the communication and/or about an identify of a user or other entity associated with the virtual machine node. Furthermore, after a first communication to a first remote service is authenticated by the node manager system for a particular virtual machine node, at least some later communications from the virtual machine node may be treated by the node manager system as being authenticated without having to perform actual authentication activities for those later communications (e.g., all communications sent until the configuration of the virtual machine node changes, all communications sent to the same first remote service until the configuration of the virtual machine node changes, certain communications that meet specified criteria, etc.). Moreover, in at least some embodiments, the node manager system may enhance access to remote services for only certain communications from virtual machine nodes. For example, the node manager 159 may further have a second service component (not shown) that is specific to a second remote service, but may not have a service-specific component for a third remote service (not shown). If so, the node manager 159 may use that second service component to enhance at least some communications from virtual machine nodes to that second remote service, but may merely forward communications between virtual machine nodes and that third remote service without providing any enhanced access. In addition, only certain types of communications to remote services may be enhanced, such as to enhance communications for specific types of functionality (e.g., requests to store information and/or to retrieve stored information for remote service 180), but not for other types of functionality (e.g., to access account information or other administrative information for a client).

Thus, in this example, due to the service-specific capabilities 158, the node manager 159 is able to access the functionality of remote service 180 that is requested by client node 157, but in an enhanced manner that does not involve any interactions with the hardware load balancer 185 or the multiple Web servers 175 of the remote service. Accordingly, those parts of the remote service 180 may have additional capacity to handle other requests via the standard default interface (e.g., communication(s) 162*a* from other computing systems 198 that are forwarded 162*b* to the hardware load balancer 185 via the network 165), or in some situations may be reduced or eliminated (e.g., to reduce the number of Web server devices). In addition, in this example, the enhanced access to the remote service 180 involved additional communications by the node manager 159 relative to the communications from computing system 105 in FIG. 1A, since the node manager 159 first retrieved information about which data storage server held the desired data, and then interacted with that data storage server to obtain the desired data. Such additional communications may be warranted in certain situations, such as if the monetary or other costs (e.g., time costs) of such additional communications are outweighed by the benefits from the enhanced access.

In other embodiments, such additional communications by the node manager 159 may not be used, such as if desired functionality from a particular remote service may be obtained with a single communication to the remote service (e.g., via a standard interface for the remote service, or via a single communication to one or more internal parts of the remote service). For example, with respect to example remote service 180, the node manager system could perform communication authentication activities, and then send a single message to one of the Web servers 175 (whether via the hardware load balancer 185, or instead directly, such as if the service-specific capabilities 158*b* include software-based load balancing capabilities) to obtain and provide the desired group of information. Alternatively, if the data storage manager 190 was instead able to retrieve and provide a desired group of information rather than providing information about where that information is located, a single communication from the node manager 159 could instead be sent to the data storage manager 190 (whether via the hardware load balancer 185 and/or a Web server 175, or instead directly) to obtain and provide the desired group of information. In some embodiments, other communications than those illustrated may occur, such as if the performance of authentication activities by node manager 159 using authentication sub-component 158*a* involves one or more communications to the remote service 180, such as to coordinate the authentication activities with one of the Web servers 175 or for other purposes.

It will be appreciated that the example of FIG. 1B is simplified for the sake of explanation, and that the described techniques may be used in a variety of other situations. For example, while the node manager 159 provides the access enhancement capabilities in FIG. 1B, in other embodiments other systems or devices may provide similar functionality. For example, one or more of the devices 107 in FIG. 1A may provide similar functionality for client computing system 105, regardless of whether any virtual machine nodes are present on the computing system 105. Furthermore, in other embodiments, the node manager system and/or client computing node may have other forms. For example, the node manager system may provide an environment in which other software programs may execute (e.g., an emulation environment; an interpreter environment, such as a Java Virtual Machine environment; etc.), and the client computing node may be a software program executing within the node manager system environment.

In addition, various additional types of functionality may be provided as part of enhancing access to remote services in at least some embodiments. For example, in at least some embodiments and situations, a node manager system may be able to perform all activities needed to respond to a request from a managed computing node for functionality from a remote service without interacting with the remote service, and if so may directly generate and provide a response to the managed computing node. As one example, in some embodiments, one or more node manager systems may maintain a local cache or other store of information received from one or more remote services, and may respond to requests for particular groups of stored information from a remote service with locally stored information (e.g., if the locally stored information is sufficiently recent and/or satisfies other criteria).

A node manager system may intercept or otherwise receive copies of communications sent from managed computing nodes in various ways in various embodiments. As previously noted, in some embodiments a physical architecture of interconnections will cause such communications to be directed through the node manager system, such as if the node manager system is part of a hypervisor for a client virtual machine node, or if the node manager system is part of a proxy system managing communications from a client computing system. In addition, the node manager system may perform activities such as causing a domain name specified by a client node to be resolved to a network address (e.g., an IP address) in a specialized manner, such as to select a network address corresponding to the node manager system and thus cause the client node to communicate with the node manager system while the client node believes that the node manager system is actually an intended remote service. Furthermore, when generating one or more communications to a remote service on behalf of a managed computing node, the node manager system may further in some embodiments consider various options about how the remote service may provide requested functionality and attempt to select an optimal or otherwise preferred option—as one example, if the remote service has multiple alternative computing systems that may provide a particular type of requested functionality, the node manager system may attempt to select the remote service computing system that is most proximate (e.g., in a geographical sense and/or logical network sense) and/or that currently has the most capacity (e.g., by performing software-based load balancing).

As previously noted, in at least some embodiments the node manager system may perform its activities to enhance access for a managed computing node to a remote service without awareness and/or acquiescence of the managed computing node, while in other embodiments such awareness and/or acquiescence of the managed computing node may be present. Similarly, while in at least some embodiments the node manager system may interact with a remote service on behalf of a managed computing node in such a manner that the remote service is aware of and/or acquiesces to the activities of the node manager system (e.g., with the node manager system acting as an authorized requester that has increased privileges relative to others such as the managed computing node), in other embodiments the remote service may not be aware of and/or acquiesce to the node manager system interactions being performed by other than the managed computing node. Regardless of the awareness or acquiescence of the managed computing node and/or remote service, the node manager system may in at least some embodiments further perform its activities and interactions with the managed computing node and/or remote service in such a manner as to satisfy any established parameters for interactions between the managed computing node and remote service (e.g., to satisfy any communication volume constraints, communication timing constraints, communication quality constraints, etc.).

Furthermore, in some embodiments, the node manager system may enhance access only to certain remote services, such as remote services provided by the same entity as the entity who operates the node manager system, remote services that have a predefined affiliation with the node manager system, remote services that provide service-specific components and/or interfaces to enable the node manager to provide the enhanced access to the remote service, etc.

Thus, the described techniques for a node manager system to enhance access by a managed computing node to a remote service may provide a variety of benefits, including benefits to the managed computing nodes, to the remote service, and/or to the node manager system. For example, by enabling a node manager system to perform at least some activities specific to a remote service, the remote service may in some embodiments and situations obtain benefits equivalent to having a distributed or decentralized service, but without having to provide and maintain the computing systems and related software on which the node manager systems operate. In addition, with respect to managed computing nodes and node manager systems, the operation of the node manager systems may in some embodiments and situations enable faster communications and/or less communications. For example, for a remote service that provides a stateless interface in which multiple received communications from a managed computing node are repeatedly authenticated and otherwise repetitively processed, a node manager system may be able to provide at least some of the beneficial effects of state-based interactions for the communications, such as by maintaining information about prior authentications and/or other interaction information for the managed computing node and remote service so that current communications and interactions may be made more efficient (e.g., by not performing additional authentications if information about a managed computing node is trusted or known to be accurate to at least a desired degree of certainty).

In addition, while not illustrated in FIGS. 1A and 1B, in at least some embodiments computing systems 105 and/or 155 may be part of a group of related physical computing systems, such as multiple computing systems that are part of a program execution service for executing multiple programs on behalf of multiple users of the service. Such a program execution service may use multiple computing systems on multiple physical networks (e.g., multiple physical computing systems and networks within a data center) in order to execute third-party customers' programs, including multiple virtual machine nodes on at least some of the computing systems that are each able to execute one or more programs for a customer. In such embodiments, customers may provide programs to be executed to the execution service, and may reserve execution time and other resources on physical or virtual hardware facilities provided by the execution service. In addition, customers may define virtual networks that will be used by the program execution service, so as to transparently provide computing nodes of the virtual network with the appearance of operating on a dedicated physical network. Additional details related to the operation of example embodiments of a program execution service with which the described techniques may be used are available in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" and in U.S. application Ser. No. 11/692,038 filed Mar. 27, 2007 and entitled "Configuring Intercommunications Between Computing Nodes;" each of which is incorporated herein by reference in its entirety.

Figure 2:
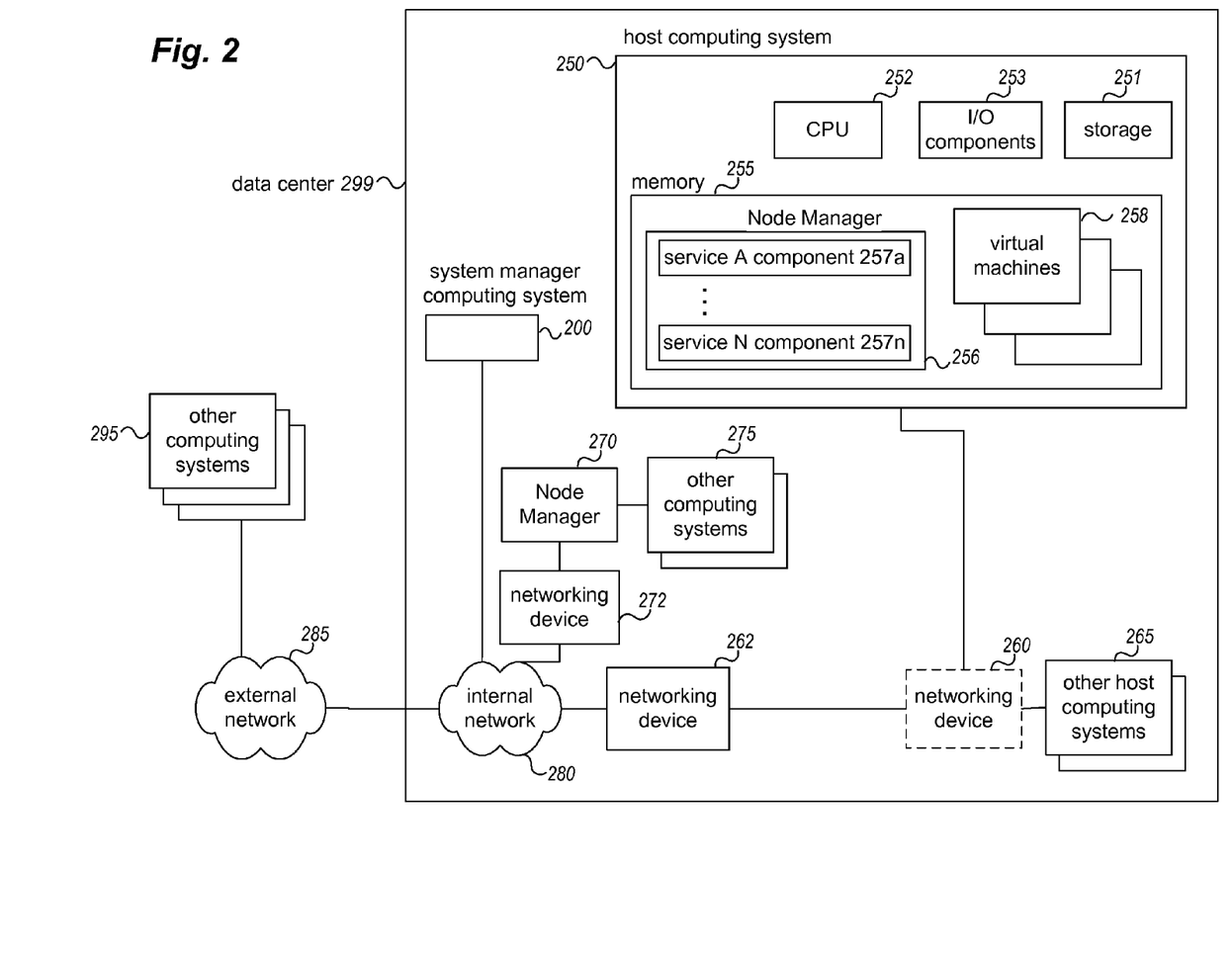
FIG. 2 is a block diagram illustrating an example computing system suitable for executing an embodiment of a system for providing enhanced access to remote network-accessible services.

FIG. 2 is a block diagram illustrating example computing systems suitable for executing an embodiment of a system for providing enhanced access to remote network-accessible services. In particular, FIG. 2 illustrates a data center 299 that includes multiple computing systems (e.g., for use as part of a program execution service), along with multiple Node Manager systems for use in providing enhanced access to remote services for at least some of the computing systems of the data center. In this example embodiment, the data center 299 includes a system manager computing system 200 to manage various operations of the data center (e.g., to manage program execution services provided via the data center), an example host computing system 250 capable of executing one or more virtual machine nodes, other host computing systems 265 that are similar to host computing system 250 and may each provide one or more virtual machine nodes, and other computing systems 275 that execute software programs without providing virtual machine nodes.

The computing systems 200, 250, 265 and 275 are connected to one another via an internal network 280, and various networking devices 262, 272, and optionally 260 may be used to connect the computing systems to the internal network. For example, networking devices 262 and 272 may each be a router or a bridge, and optional networking device 260 may be a switch or a hub. In the illustrated example, the networking device 262 provides a gateway between the network 280 and host computing systems 250 and 265, and the optional networking device 260 may operate to join host computing systems 250 and 265 onto a single physical network. A variety of other networking devices may similarly be present, but are not shown for the sake of simplicity. Thus, the network 280 may be an interconnection network that joins multiple disparate physical networks within the data center 299, and provides access in this example to external computing systems 295 via an external network 285. In a typical arrangement, data center 299 may include hundreds or thousands of host computing systems such as those illustrated here, organized into a large number of distinct physical networks. The external computing systems may also provide various functionality, including providing various remote services (not shown) that are available to the computing systems of the data center.

Host computing system 250 is shown in additional detail relative to the other computing systems for the purpose of illustration, and includes a CPU 252, various I/O components 253, storage 251, and memory 255. The I/O components may include, for example, a display, network connection, computer-readable media drive, and other I/O devices (e.g., a mouse, keyboard, etc.). The host computing system 250 functions to host one or more virtual machines 258 in memory 255, such as to execute programs on behalf of various customers. A Node Manager system 256 is also executing in the memory 255 to manage operations of the virtual machines 258. In addition, in the illustrated embodiment, the Node Manager system 256 operates to provide the virtual machines 258 with enhanced access to remote network-accessible services in a manner similar to that discussed in greater detail elsewhere. In this example, the Node Manager system 256 includes various service-specific components 257a-257n for use in interacting with remote services A-N (not shown), such as remote services provided by the other computing systems 295.

The other host computing systems 265 may each be similar to that of host computing system 250, such as by each including one or more virtual machines (not shown) and a Data Manager system (not shown) to manage operations of those virtual machines. In addition, this example embodiment includes multiple computing systems 275 that do not host virtual machines, and a separate computing device that acts as Node Manager system 270 to similarly provide those computing systems 275 with enhanced access to remote network-accessible services.

It will be appreciated that computing systems 200, 250, 265, 275, and 295, and networking devices 260, 262 and 272, are merely illustrative and are not intended to limit the scope of embodiments of the present disclosure. For example, computing system 250 may be connected to other devices that are not illustrated, including through one or more other networks external to the data center 299, such as the Internet or via the Web. More generally, a computing node or other computing system may comprise any combination of hardware or software that can interact and perform the described types of functionality, including without limitation desktop or other computers, database servers, network storage devices and other network devices, PDAs, cell-phones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated components and systems may in some embodiments be combined in fewer components or distributed in additional components. Similarly, in some embodiments the functionality of some of the illustrated components may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or systems may execute in memory on another device and communicate with the illustrated computing system via inter-computer communication. Some or all of the components, systems and data structures may also be stored (e.g., as software instructions or structured data) on a computer-readable medium, such as a hard disk, a memory, a network, or a portable media article to be read by an appropriate drive or via an appropriate connection. The systems, components and data structures may also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3:
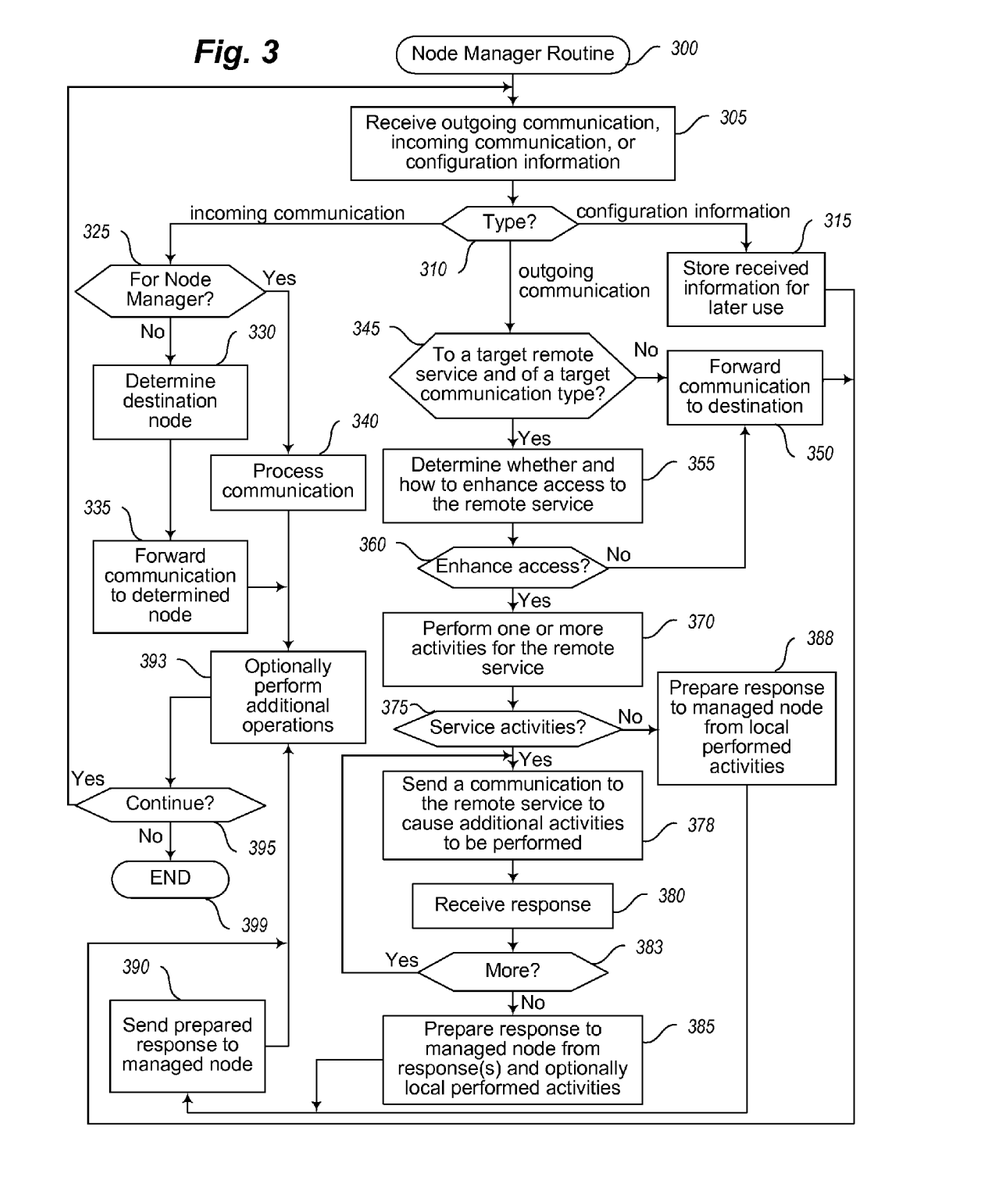
FIG. 3 illustrates a flow diagram of an example embodiment of a Node Manager routine.

FIG. 3 illustrates a flow diagram of an example embodiment of a Node Manager routine. The routine may be provided by, for example, execution of the Node Manager systems 256 or 270 of FIG. 2 and/or of the Node Manager system 159 of FIG. 1B, such as to provide client computing nodes with enhanced access to remote network-accessible services.

The illustrated embodiment of the routine 300 begins at block 305, where it receives an outgoing communication, an incoming communication, or configuration information. In this embodiment, an outgoing communication is a communication sent by a computing node managed by the routine, such as a virtual machine executing on a managed host computing system. An incoming communication is a communication sent by an external computing system to a managed computing node or the node manager system. Configuration information includes information that may be used by the routine to provide managed local client nodes with enhanced access to remote services, such as information for a remote service to use in providing enhanced access to that remote service (e.g., a software component that when executed provides at least some capabilities specific to the remote service), or configuration information regarding what types of communications to which remote services from which managed nodes are to be handled by the routine. The communications and/or configuration information may be received in various ways, such as if the node manager routine is part of a component through which communications to and/or from the managed computing nodes pass, or if the node manager routine may otherwise receive and optionally modify or otherwise manipulate such communications.

In block 310, the routine determines the type of communication or information received, and continues to block 315 if configuration information is received. In block 315, the routine stores the received configuration information for later use.

If it is instead determined in block 310 that an incoming message or other communication has been received, either for the Node Manager or for one or more managed computing nodes, the routine continues to block 325 to determine if the communication is for the Node Manager routine. Such incoming communications for managed computing nodes or the Node Manager routine may include a variety of types of communications, including communications that are unrelated to accessing remote services. If it is determined in block 325 that the communication is for the Node Manager routine, the routine continues to block 340 to process the received communication (e.g., to store the communication for later use by an operator user who maintains the Node Manager), and if not the routine continues to block 330 to determine the one or more destination managed computing nodes for the communication (e.g., based on addressing information for the communication, such as in a packet header that includes a source and destination address). As described in greater detail with respect to block 380, communications that are received by the routine as part of interacting with remote services when providing enhanced access to those remote services are handled elsewhere, such as with respect to block 380. After block 330, the routine continues to block 335 to forward the received communication to the determined managed computing node (s). Forwarding the communication may include sending or otherwise transmitting it onto a physical network (e.g., by providing the communication to a network driver or interface to be transmitted via a network interface device) if a destination managed computing node is part of a computing system distinct from the computing system executing the routine, or may include storing the communication in an appropriate location in memory if a destination managed computing node is a virtual machine node on the same computing system as the computing system executing the routine.

If it is instead determined in block 310 that an outgoing communication has been received from a managed computing node, the routine continues to block 345 to determine whether the outgoing communication is to a target remote service for which the routine may provide enhanced access and whether the outgoing communication is of a type for which the routine may provide enhanced access, such as to request one or more specified types of functionality from the remote service. If not, the routine continues to block 350 to forward the received communication to the indicated destination(s). Otherwise, the routine continues to block 355 to determine whether and how to enhance access of the managed computing node to the remote service for the outgoing communication, such as based on previously received configuration information specific to the remote service and/or to the managed computing node. In block 360, the routine then determines whether enhanced access is to be provided, and if not continues to block 350.

Otherwise, if enhanced access is to be provided, the routine continues to provide that enhanced access with respect to blocks 370-390. In particular, in block 370 the routine locally performs one or more activities for the remote service (e.g., authentication activities with respect to the outgoing communication), such as based on previously obtained configuration information for the remote service and/or based on dynamically obtained configuration information for the remote service (e.g., by interacting with the remote service and/or other source of the configuration information). After block 370, the routine continues to block 375 to determine whether there are one or more other activities to be performed by the remote service as part of the providing of the requested functionality for the outgoing communications, such as if the locally performed activities for the remote service are only a subset of the activities to be performed. If not, the routine continues to block 388 to prepare a response message for the managed computing node to the received outgoing communication, such as to provide data or other response (e.g., status information) from the locally performed activities of block 370.

Otherwise, the routine continues to block 378 to generate and send one or more communications to the remote service to initiate one or more additional activities to be performed by the remote service as part of providing requested functionality to the managed computing node. In at least some embodiments, the one or more sent communications are such that the remote service does not perform some or all of the locally performed activities, such as based on a particular type of generated communication, a particular destination of the generated communication, information included in the communication (e.g., instructions related to the one or more additional activities to be performed by the remote service and/or of the one or more activities already locally performed), etc. Furthermore, the sent communication(s) may be generated in various ways, including by altering the received outgoing communication and/or by using information from the received outgoing communication as part of the generated communication(s). The routine then waits in block 380 to receive one or more responses to the sent communications. After receiving the response(s), the routine in block 383 determines whether there are more additional activities to be performed by the remote service, and if so returns to block 378. Otherwise, the routine continues to block 385 to prepare a response message for the managed computing node to the received outgoing communication, such as to forward one or more of the responses received in block 380 and/or to provide data from the locally performed activities of block 370.

After blocks 385 or 388, the routine continues to block 390 to send the prepared response to the managed computing node. After blocks 315, 335, 340, 350 or 390, the routine continues to block 393 to optionally perform one or more additional operations, such as to reflect housekeeping activities or other activities that are not related to providing enhanced access to remote services. The routine then continues to block 395 to determine whether to continue processing received communications and configuration information. If so, the routine returns to block 305, and if not continues to block 399 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having stored contents that configure a computing system hosting multiple virtual machines to:

execute, on a first virtual machine of the multiple virtual machines hosted on the computing system, a first software program for a client;

execute, on the computing system and as part of software that manages operations of the multiple virtual machines, a node manager component separate from the first software program that uses stored information on the computing system specific to a remote service being provided over one or more computer networks by one or more other server computing systems separate from the computing system;

receive, by the executing node manager component on the computing system, a communication sent from the first software program of the client on the computing system that is intended for a first interface of the remote service, wherein the communication requests functionality from the remote service that includes performance by the remote service of multiple activities to provide the functionality;

perform, by the executing node manager component on the computing system, and using the stored information specific to the remote service and additional stored information on the computing system related to the client, a subset of the multiple activities on behalf of the remote service; and send, by the computing system and after the performing of the subset, one or more other communications over the one or more computer networks to a separate second interface of the remote service on behalf of the client in place of the received communication, wherein the sent one or more other communications initiate performance of the multiple activities other than the performed subset by the remote service on the one or more other server computing systems.

2. The non-transitory computer-readable medium of claim 1 wherein the performing of the subset of activities on behalf of the remote service includes authenticating the received communication based on the stored information specific to the remote service and on the additional stored information related to the client and on further information included in the received communication.

3. The non-transitory computer-readable medium of claim 2 wherein the first interface of the remote service is a default interface for unauthenticated communications, wherein authentication activities are not performed by the remote service for communications received via the separate second interface, and wherein the sending of the one or more other communications includes generating the one or more other communications by modifying the received communication to include at least one of information about the authenticating or information specific to the separate second interface.

4. The non-transitory computer-readable medium of claim 2 wherein the stored contents include software instructions that, when executed, further configure the computing system to update the stored information on the computing system to include information about the client being authenticated, and sending one or more further communications from the executing first software program to the separate second interface of the remote service without performing further authenticating based on the updated stored information.

5. The non-transitory computer-readable medium of claim 1 wherein the functionality requested from the remote service includes obtaining data from the remote service, and wherein the performing of the subset of multiple activities includes providing at least some of the data to the executing first software program of the client from a local data cache on the computing system.

6. A computer-implemented method comprising:
executing a program on a first virtual machine of multiple virtual machines hosted by a host computing system, wherein the host computing system includes an executing software component that manages communications for the multiple virtual machines;

configuring the executing software component on the host computing system to further execute a node manager component that includes information specific to a remote service being provided over one or more computer networks by one or more other server computing systems separate from the host computing system;

receiving, by the executing node manager component on the host computing system, a communication that is sent by the executing program on the first virtual machine and is intended for a first interface of the remote service, wherein the communication requests functionality from the remote service that includes performance of multiple activities;

performing, by the executing node manager component on the host computing system before the communication is sent from the host computing system, and using the information specific to the remote service, a subset of the multiple activities on behalf of the remote service; and sending, by the host computing system and after the performing of the subset, one or more other communications over the one or more computer networks to a separate second interface of the remote service in place of the received communication, wherein the sent one or more other communications initiate performance of the multiple activities other than the performed subset by the remote service on the one or more other server computing systems.

7. The computer-implemented method of claim 6 wherein the configuring of the executing software component on the host computing system further includes storing information on the host computing system about a user for which the program is executed on the first virtual machine, and wherein the performing of the subset of activities on behalf of the remote service includes authenticating the received communication based at least in part on the stored information about the user.

8. The computer-implemented method of claim 7 wherein the first interface of the remote service is a default interface for unauthenticated communications, wherein authentication activities are not performed by the remote service for communications received via the separate second interface, and wherein the sending of the one or more other communications includes generating the one or more other communications by modifying the received communication to include at least one of information about the authenticating or information for use by the separate second interface.

9. The computer-implemented method of claim 6 wherein the performing of the subset of the multiple activities is based at least in part on information previously received from the remote service in response to a prior communication sent to the remote service from one or more of the multiple hosted virtual machines.

10. The computer-implemented method of claim 6 wherein the receiving of the communication, the performing of the subset of the multiple activities and the sending of the one or more other communications is performed for each of multiple communications from multiple clients associated with the multiple virtual machines.

11. The computer-implemented method of claim 7 further comprising, after the authenticating, updating the stored information on the host computing system to include information about the first virtual machine being authenticated, and sending one or more additional communications from the first virtual machine node to the separate second interface of the remote service without performing further authenticating based on the updated stored information.

12. The computer-implemented method of claim 6 wherein the requested functionality from the remote service includes obtaining data from the remote service, and wherein the performing of the subset of multiple activities includes providing at least some of the data to the first virtual machine by the executing node manager component from a local data cache on the host computing system.

13. A computing system comprising:
one or more hardware processors;
multiple virtual machines hosted on the computing system; and
one or more memories with stored instructions that, when executed by at least one of the one or more hardware processors, execute a virtual machine manager that manages operations of the multiple virtual machines and that uses stored information on the computing system specific to a web service being provided over one or more computer networks by one or more other server computing systems separate from the computing system, the managing of the operations including:
executing, on a first virtual machine of the multiple virtual machines, a first software program for a client, and updating the stored information on the computing system to include identifying information for the client;
obtaining, by the virtual machine manager, a communication from the first virtual machine intended for a web service interface of the web service, wherein the web service is configured to authenticate communications sent to the web service interface;
authenticating, by the virtual machine manager before the obtained communication is sent from the computing system, and using the updated stored information, the obtained communication based at least in part on the information specific to the web service and on the identifying information for the client;
generating, by the virtual machine manager, one or more other communications that are based on the obtained communication and that include information from the authenticating for use by the web service; and
sending the one or more other communications over the one or more computer networks to the web service on behalf of the executing first software program in place of the obtained communication.

14. The computing system of claim 13 wherein the sending of the one or more other communications to the web service includes sending the one or more other communications to a storage node of the web service that stores data specified in the obtained communication.

15. The computing system of claim 13 wherein the obtained communication is sent by the executing first software program to a public web service interface of the web service, and wherein the sending of the one or more other communications includes sending the one or more other communications to a separate private interface of the web service.

16. The computing system of claim 15 wherein the public web service interface of the web service is a default interface for unauthenticated communications, wherein authentication activities are not performed by the web service for communications received via the separate private interface, and wherein the sending of the one or more other communications includes generating the one or more other communications by modifying the obtained communication to include at least one of information about the authenticating or information specific to the separate private interface.

17. The computing system of claim 13 wherein the managing of the operations further includes, after the authenticating, updating the stored information on the computing system to include information about the first virtual machine being authenticated, and sending one or more further communications from the first virtual machine to the web service over the one or more computer networks without performing further authenticating based on the updated stored information.

18. The computing system of claim 13 wherein the obtained communication includes a request for data from the web service, and wherein the managing of the operations further includes, responsive to the obtaining of the communication, providing at least some of the data to the first virtual machine from a local data cache on the computing system.

* * * * *

UNITED STATES PATENT AND TRADEMARK OFFICE
CERTIFICATE OF CORRECTION

| | |
|---|---|
| PATENT NO. | : 9,455,969 B1 |
| APPLICATION NO. | : 13/619884 |
| DATED | : September 27, 2016 |
| INVENTOR(S) | : Luis Felipe Cabrera et al. |

It is certified that error appears in the above-identified patent and that said Letters Patent is hereby corrected as shown below:

On the Title Page

Column 1, Item (63), Line 1, under Related U.S. Application Data, change "Continuation-in-part" to --Continuation--.

Signed and Sealed this
Sixteenth Day of April, 2019

Andrei Iancu
*Director of the United States Patent and Trademark Office*